(12) United States Patent
Bowden et al.

(10) Patent No.: US 7,487,712 B2
(45) Date of Patent: Feb. 10, 2009

(54) IN-VEHICLE COFFEE MAKER

(75) Inventors: Upton Beall Bowden, Canton, MI (US); Jeffery N. Conley, Belleville, MI (US); Kurt Nuler, Canton, MI (US); Michael Aaron Haen, Ann Arbor, MI (US); Richard R. Vaughan, Berkley, MI (US)

(73) Assignee: Visteon Global Technologies, Inc., Van Buren Township, MI (US)

( * ) Notice: Subject to any disclaimer, the term of this patent is extended or adjusted under 35 U.S.C. 154(b) by 581 days.

(21) Appl. No.: 11/206,480

(22) Filed: Aug. 18, 2005

(65) Prior Publication Data

US 2007/0039477 A1    Feb. 22, 2007

(51) Int. Cl.
    *A47J 31/00*    (2006.01)
(52) U.S. Cl. .................. 99/295; 99/307; 99/302 R
(58) Field of Classification Search .............. 99/295, 99/307, 302 R, 285, 317, 322, 315, 304, 284, 99/279
See application file for complete search history.

(56) References Cited

U.S. PATENT DOCUMENTS

| | | | |
|---|---|---|---|
| 3,446,624 A | 5/1969 | Luedtke | |
| 3,570,390 A * | 3/1971 | Jordan et al. | 99/282 |
| 4,151,790 A | 5/1979 | Spirk | |
| 4,452,130 A | 6/1984 | Klein | |
| 4,487,114 A | 12/1984 | Abdenour | |
| 4,744,291 A * | 5/1988 | Wallin | 99/280 |
| 4,748,901 A * | 6/1988 | Burmeister | 99/306 |
| 4,875,408 A | 10/1989 | McGee | |
| 5,123,335 A * | 6/1992 | Aselu | 99/295 |
| 5,159,873 A | 11/1992 | Weeden | |
| 5,233,914 A * | 8/1993 | English | 99/282 |
| 5,377,581 A * | 1/1995 | Campbell | 99/295 |
| 5,549,035 A * | 8/1996 | Wing-Chung | 99/281 |
| 5,806,408 A | 9/1998 | DeBacker et al. | |
| 6,202,542 B1 | 3/2001 | Melton | |
| 6,263,781 B1 | 7/2001 | Calagui | |
| 6,869,627 B2 | 3/2005 | Perkovic et al. | |
| 6,892,627 B2 * | 5/2005 | Lalanne-Eygun | 99/285 |
| 2003/0209547 A1 | 11/2003 | Lin | |
| 2004/0020368 A1 | 2/2004 | Cai | |
| 2005/0000955 A1 | 1/2005 | Vu | |
| 2005/0005774 A1 | 1/2005 | Fulgoni et al. | |
| 2005/0166763 A1 | 8/2005 | Scarchilli et al. | |

FOREIGN PATENT DOCUMENTS

| | | |
|---|---|---|
| GB | 2205309 | 12/1988 |
| GR | 1003451 | 10/2000 |

\* cited by examiner

*Primary Examiner*—Reginald L Alexander
(74) *Attorney, Agent, or Firm*—Brinks Hofer Gilson & Lione

(57) ABSTRACT

An in-vehicle coffee maker includes a coffee mug and a brewing station that receives the mug, and has a lid that secures the mug therein. A pump supplies water to the lid from a water reservoir via a water line. A heating element heats the water to a predetermined temperature. The mug includes a mug portion, a drink cap, and a pod retainer. The drink cap includes a pod chamber to hold coffee grounds, and the pod retainer secures the coffee grounds therein. The pod retainer includes a opening for water to pass through, into the pod chamber, which in turn includes an opening for water to drain downward into the mug. The lid of the brewing station includes a nozzle that forms a sealed engagement with the opening in the pod retainer so water supplied from the reservoir to the lid flows into the pod chamber.

10 Claims, 4 Drawing Sheets

IN-VEHICLE COFFEE MAKER

BACKGROUND

1. Field of the Invention

The invention generally relates to an in-vehicle hot beverage maker for brewing a hot beverage within a motor vehicle.

2. Background of the Invention

Consumers of coffee and tea beverages are known to purchase and drink their selections while driving. It would save time and be convenient if consumers did not have to stop to purchase coffee.

Past concepts have includes 12 volt coffee makers that can be used within a motor vehicle, but these systems are not secured or integrated within the motor vehicle. These systems also do not address issued associated with preventing the spilling of water, post-brew drip, and do not offer sanitary means for disposing of the used coffee grounds. Additionally, these systems typically include a large housing to contain the components of the coffee maker.

Therefore, there is a need for an in-vehicle coffee maker, that is integrated into the vehicle and provides means to prevent spillage of water and post-brew drip, offers a sanitary means to dispose of used coffee grounds, and takes up little space within the vehicle

SUMMARY

In one aspect, an in-vehicle coffee maker includes a coffee mug and a brewing station adapted to receive the coffee mug. The brewing station has a lid pivotally mounted thereon such that the lid can be pivoted between an open position and a closed position. In the open position, the coffee mug can be removably placed within the brewing station. In the closed position, the lid secures the coffee mug within the brewing station. A water reservoir supplies water to the brewing station. A water line extends between the water reservoir and the lid of the brewing station to deliver water from the water reservoir to the brewing station.

The water line includes a pump assembly for pumping water from the water reservoir to the lid and a heating element for heating the water to a predetermined temperature. The coffee mug includes a mug portion, a drink cap removably mounted onto the mug portion, and a pod retainer removably mounted onto the drink cap. The drink cap includes a pod chamber formed therein. The pod chamber is adapted to hold a pod of coffee grounds and the pod retainer is adapted to secure the pod of coffee grounds within the pod chamber. The pod retainer includes a opening formed therein to allow water to be supplied through the pod retainer to the pod chamber. The pod chamber includes at least one opening formed therein to allow water to drain from the pod chamber downward into the mug portion of the coffee mug.

The lid of the brewing station includes a nozzle positioned such that when the lid is closed the nozzle forms a sealed engagement with the opening formed within the pod retainer and water supplied from the reservoir to the lid flows into the pod chamber.

In another aspect, the pod retainer includes a flow chamber having a plurality of drip holes formed therein. Water flows into the flow chamber through the opening formed within the pod retainer and drips down into the pod chamber through the drip holes.

In still another aspect, the drink cap includes a plurality of drink openings formed therein. The drink openings allow steam to escape from the mug during brewing and allow a user to drink from the coffee mug once the brewing is complete. The drink openings are spaced circumferentially apart and are positioned radially outward from the pod chamber.

In yet another aspect, the brewing station includes a sensor to detect when the coffee mug is present and when the lid is closed, and a controller that is adapted to allow water to be supplied to the lid of the brewing station only when the coffee mug is present within the brewing station and the lid is closed.

DESCRIPTION OF THE DRAWINGS

The above, as well as other advantages of the present invention, will become readily apparent to those skilled in the art from the following detailed description of a preferred embodiment when considered in the light of the accompanying drawings.

DESCRIPTION OF THE EMBODIMENTS

Figure 1:
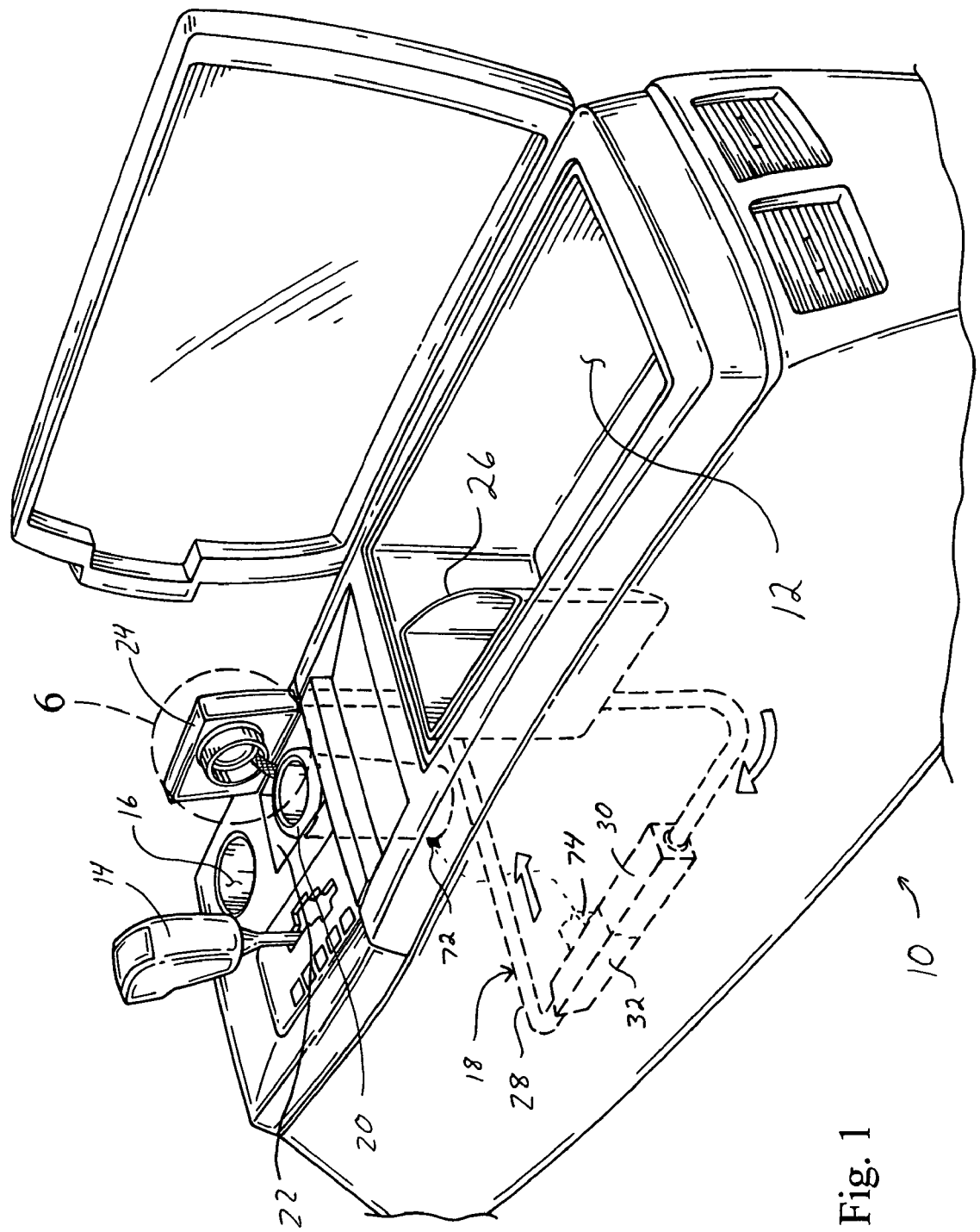
FIG. 1 is a perspective view of a vehicle console having an in-vehicle coffee maker in accordance with the present claims.

Referring to FIG. 1, a console having an in-vehicle coffee maker in accordance with the teachings of the claims herein is shown generally at 10. The console includes a storage compartment 12, an automatic gear shifter 14, and a cup holder 16. The console 10 has an in-vehicle coffee maker 18 mounted therein.

The in-vehicle coffee maker includes a coffee mug 20 and a brewing station 22. The brewing station 22 is recessed within a top surface of the console 10 and is adapted to receive the coffee mug 20 therein. The brewing station 22 further includes a lid 24 which is pivotally connected to the brewing station 22. The lid 24 can be pivoted between an open position and a closed position. In the open position, shown in FIG. 1, the coffee mug 20 can be place within and removed from the brewing station. In the closed position the lid 24 secures the coffee mug 20 within the brewing station 22.

A water reservoir 26 is mounted within the console 10 remote from the brewing station 22. As shown, the water reservoir 26 is located within the storage compartment 12 of the console 10, however, the water reservoir 26 could be located elsewhere without departing from the scope of the claims. A water line 28 extends between the water reservoir 26 and the lid 24 of the brewing station 22 to deliver water from the water reservoir 26 to the brewing station 22. The water line 28 includes a pump assembly 30 for pumping the water from the water reservoir 28 to the lid 24 and a heating element 32 for heating the water to a predetermined temperature.

Figure 3:
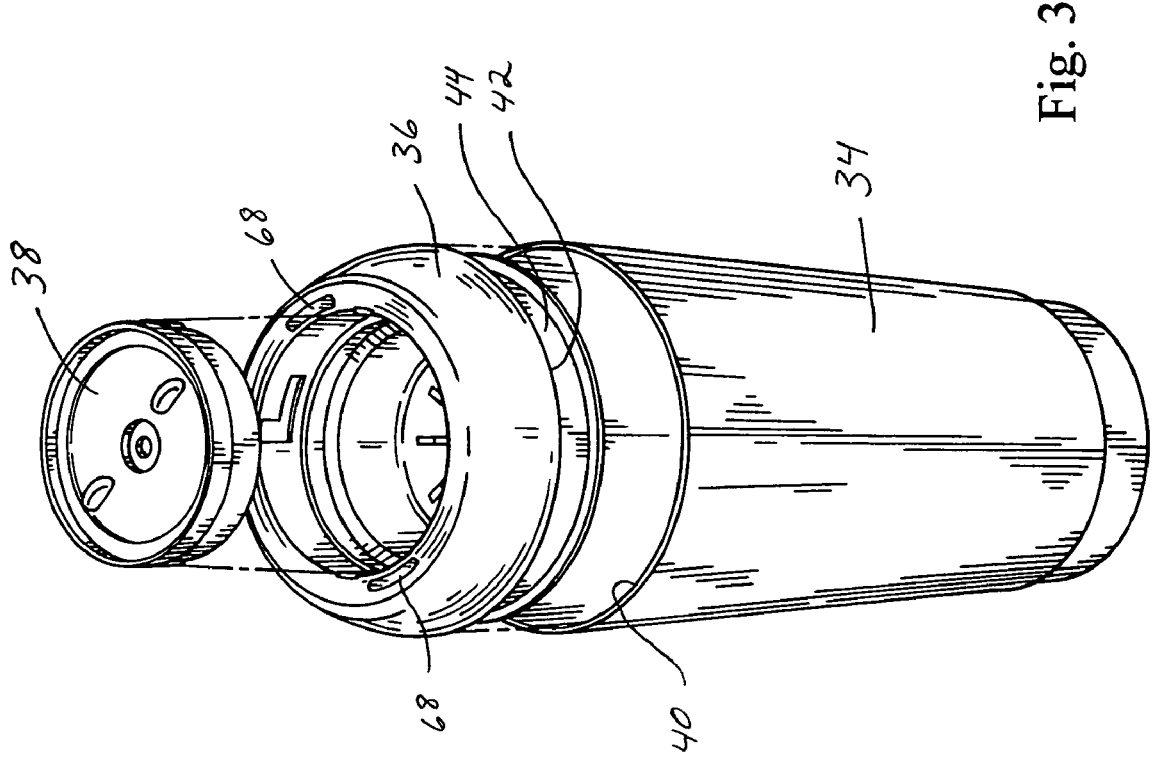
FIG. 3 is an exploded view of the coffee mug shown in FIG. 2, illustrating the mug portion, the drink cap, and the pod retainer of the coffee mug.
Figure 2:
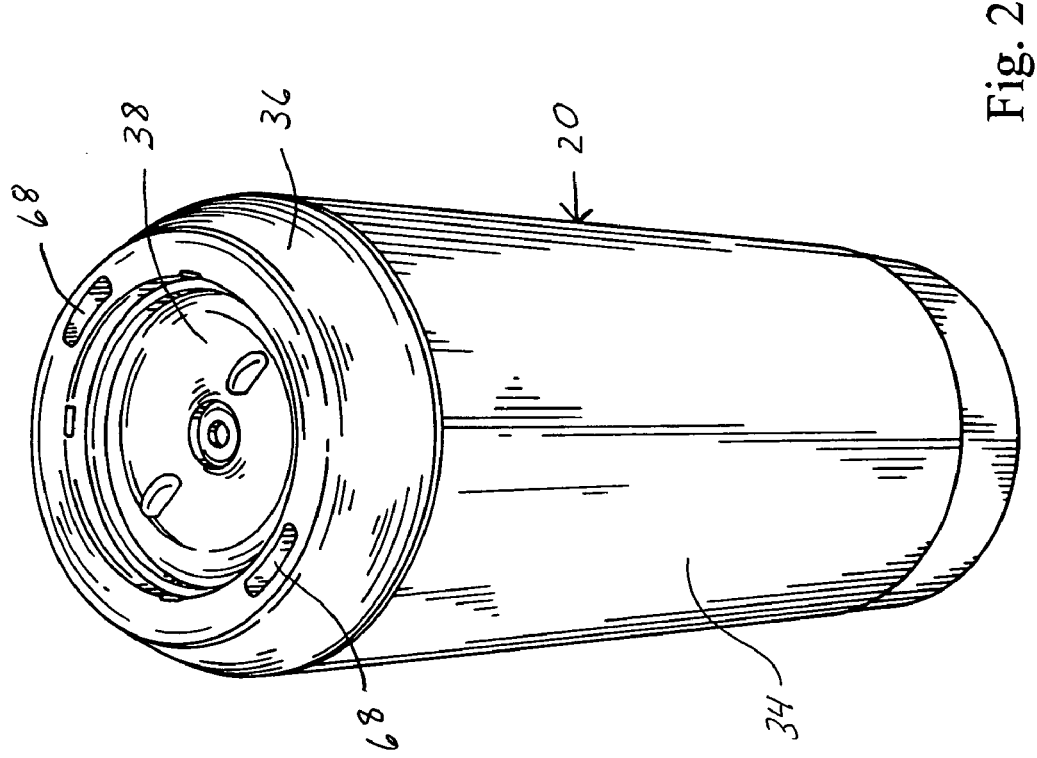
FIG. 2 is a perspective view of a coffee mug from the coffee maker shown in FIG. 1.
Figure 4:
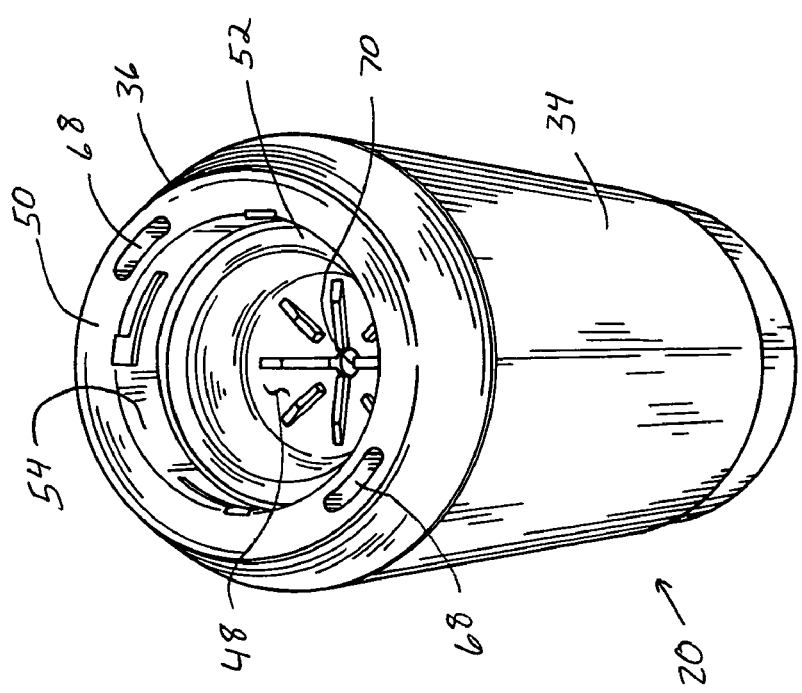
FIG. 4 is a perspective top view of the coffee mug with the drink cap in place and the pod retainer removed.

Referring to FIGS. 2, 3, and 4, the coffee mug 20 includes a mug portion 34, a drink cap 36 removably mounted onto the mug portion 34, and a pod retainer 38 removably mounted onto the drink cap 36. The mug portion 34 is cup shaped and has a generally circular top lip 40. The drink cap 36 is generally circular in shape and included a rim 42 that is positioned against the top lip 40 of the mug portion 34. A flange 44 extends axially away from the rim 42 and engages an inner diameter 46 of the mug portion to secure the drink cap 36 to the mug portion 36.

Figure 5:
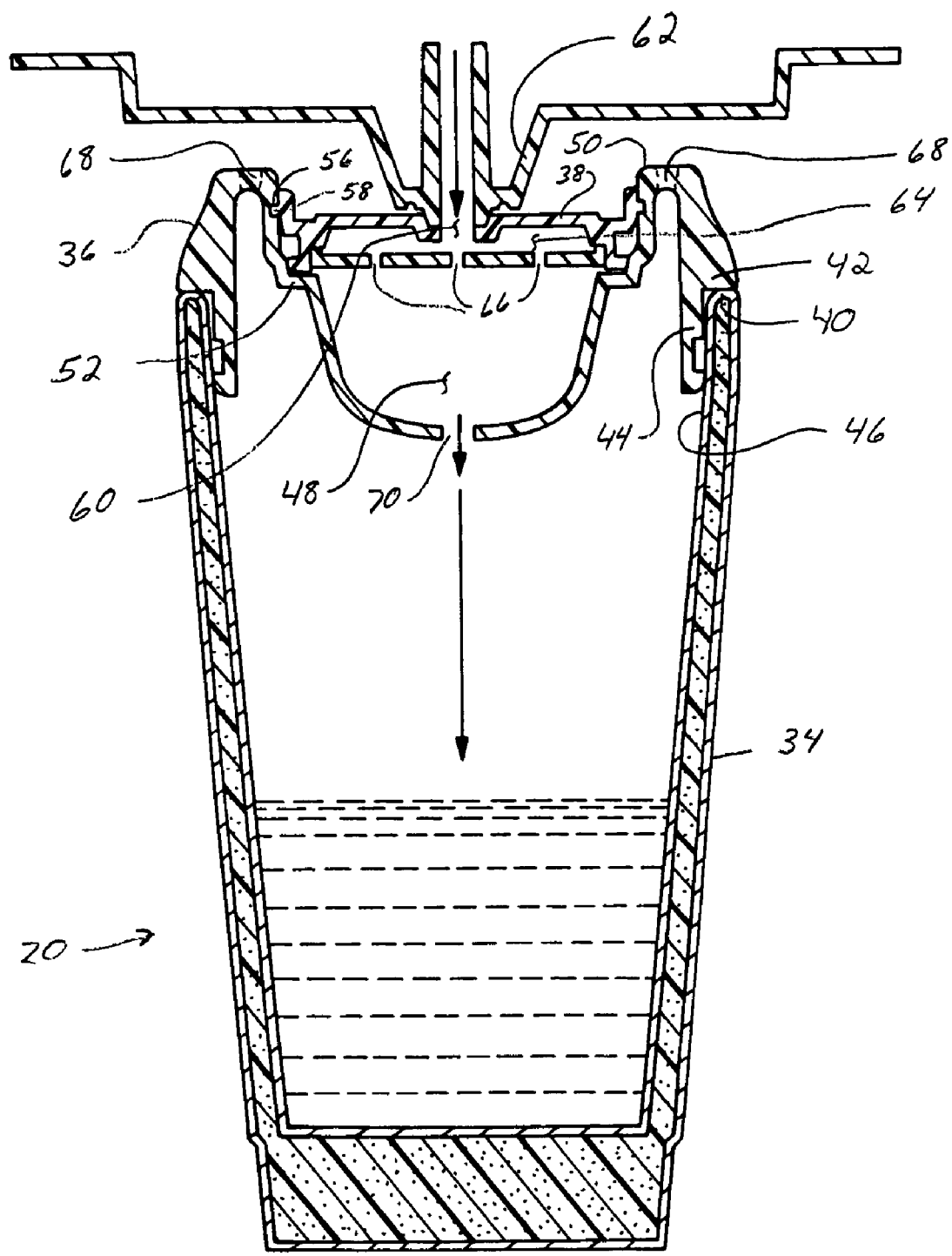
FIG. 5 is a side sectional view of the coffee mug with the lid of the brewing station in the closed position and the nozzle in engagement with the opening of the pod retainer.

The drink cap 36 also includes a pod chamber 48 formed therein. The pod chamber 48 is adapted to hold a pod of coffee grounds (not shown). The pod retainer 38 is adapted to secure the pod of coffee grounds within the pod chamber 40. Referring to FIG. 5, the pod chamber 48 is a generally bowl shaped depression formed near the center of the drink cap 36, thereby defining a drink cap rim 50 extending circumferentially around the pod chamber 48. A lip 52 extends circumferentially around an inner surface 54 of the pod chamber 48. The pod retainer 38 rests on the lip 52. The inner surface 54 of the pod chamber 48 includes an annular groove 56 and the pod retainer 38 includes a radially extending projection 58 that engages the groove 56 to secure the pod retainer 38 against the lip 52 of the pod chamber 48.

Figure 6:
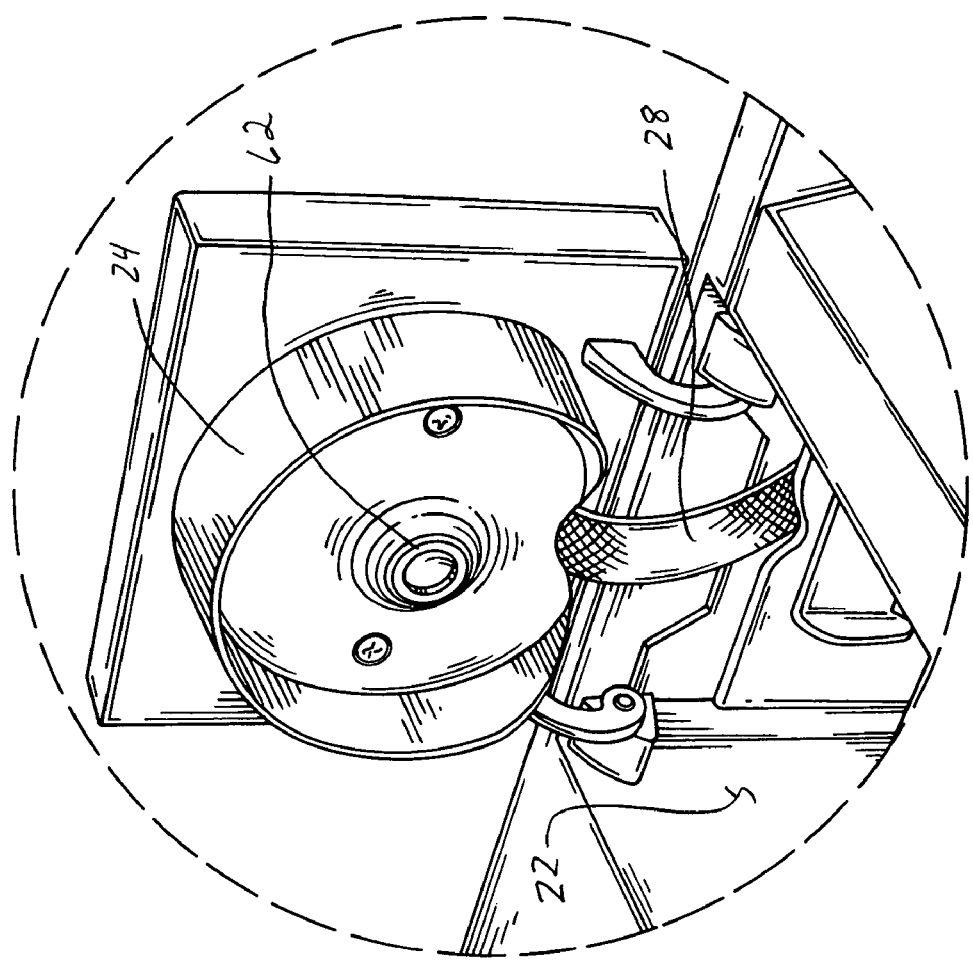
FIG. 6 is a perspective view of the brewing station with the lid in the open position.

The pod retainer includes an opening 60 formed therein. Referring to FIGS. 5 and 6, the lid 24 of the brewing station 22 includes a nozzle 62. When the lid 24 of the brewing station 22 is closed, with the coffee mug 20 therein, the nozzle 62 forms a sealed engagement with the opening 60 formed within the pod retainer 38. The pod retainer 38 further includes a flow chamber 64. Water enters the flow chamber 64 from the nozzle 62 through the opening 60 formed within the pod retainer 38. The sealed engagement between the nozzle 62 of the lid 24 and the opening 60 within the pod retainer 38 insures that hot water is not spilled or splashed outside of the brewing station 22 during brewing. This is particularly useful, since a motor vehicle may be subject to moderate or even severe bumping and jostling as the vehicle navigates through traffic and along roadways. The sealed engagement between the nozzle 62 of the lid 24 and the opening 60 formed within the pod retainer 38 insures that all of the water is transferred into the coffee mug 20.

The flow chamber 64 includes a plurality of drip holes 66 formed therein to allow water entering the flow chamber 64 to flow from the flow chamber 64 into the pod chamber 48. The drip holes 66 are spaced out across the pod retainer 38 such that water is distributed across the pod chamber 48. This insures the coffee grounds within the pod chamber 48 are evenly saturated with water. The pod chamber 48 includes at least one drain hole 70 formed therein to allow water to drip downward into the mug 34 after passing through the coffee grounds in the pod chamber 48.

The rim 50 of the drink cap 36 includes a plurality of drink openings 68 formed therein to allow steam to escape from the mug 34 during brewing and to allow a user to drink from the coffee mug 20 once the brewing is complete. The drink openings 68 are spaced circumferentially apart and positioned radially outward from the pod chamber 48. The location of the pod chamber 48 radially within the rim 50 of the drink cap 36 allows a user to drink the contents of the coffee mug 20 without removing the pod retainer 38 or the pod of coffee grounds held therein. This eliminates the problems associated with post-brew drip from conventional style coffee makers that might be used within a vehicle. The coffee mug 20 of the present invention holds the coffee grounds within it, so any coffee that drips from the coffee grounds after brewing will simply fall down into the mug 34 to be consumed.

The in-vehicle coffee maker 18 further includes a sensor 72 positioned within the brewing station 22 that senses the presence of the coffee mug 20 therein and if the lid 24 of the brewing station 22 is closed. A controller 74 will prevent the brewing station 22 from being activated unless the coffee mug 20 is in the brewing station 22 and the lid 24 to the brewing station 22 is closed. This insures that the brewing cycle cannot be accidentally activated, thereby causing hot water to be sprayed from the nozzle 62 into the brewing station 22 or the interior of the vehicle. The controller 74 further meters the amount of hot water supplied to the brewing station 22.

To use the in-vehicle coffee maker 18 a user simply places a pre-packages pod of coffee grounds within the pod chamber 48 of the drink cap 36, and places the pod retainer 38 in place to hold the pod of coffee grounds within the pod chamber 48. The user then places the coffee mug 20 within the brewing station 22 and pushes the lid 24 to the closed position. Once the brewing cycle is activated, the pumping assembly 30 will pump water from the water reservoir 26, through the heating element 32, and to the lid 24 of the brewing station 22 via a water line 28.

The water passes through the nozzle 62 in the lid 24 and through the opening 60 within the pod retainer 38 into the flow chamber 64. The water flows out of the flow chamber 64 through the drip holes 66 formed therein and falls onto the pod of coffee grounds located within the pod chamber 48. The water passes through the coffee grounds and drips out of the pod chamber 48 through the drip hole 70 formed at the bottom of the pod chamber 48, downward into the mug portion 34 of the coffee mug 20.

Once the brewing cycle is complete, the user pivots the lid 24 of the brewing station 22 to the open position and removes the coffee mug 20. The coffee or tea within the coffee mug 20 can be consumed through the drink openings 68 formed within the rim 50 of the drink cap 36. When the contents of the coffee mug 20 are gone, the user can remove the pod retainer 38 and dump the used pod of coffee grounds into a trash receptacle.

In accordance with the provisions of the patent statutes, the present invention has been described in what is considered to represent its preferred embodiment. However, it should be noted that the invention can be practiced otherwise than as specifically illustrated and described.

What is claimed is:

1. An in-vehicle coffee maker, comprising:
   a coffee mug;
   a brewing station adapted to receive the coffee mug, the brewing station having a lid pivotally mounted thereon such that the lid can be pivoted between an open position, wherein the coffee mug can be removably placed within the brewing station, and a closed position, wherein the lid secures the coffee mug within the brewing station;
   a water reservoir;
   a water line extending between the water reservoir and the lid of the brewing station to deliver water from the water reservoir to the brewing station, the water line including a pump assembly for pumping the water from the water reservoir to the lid and a heating element for heating the water to a predetermined temperature;
   the coffee mug including a mug portion, a drink cap removably mounted onto the mug portion, and a pod retainer removably mounted onto the drink cap;
   the drink cap includes a pod chamber formed therein, the pod chamber is adapted to hold a pod of coffee grounds and the pod retainer is adapted to secure the pod of coffee grounds within the pod chamber, the pod retainer includes an inlet opening formed therein to allow water to be supplied through the pod retainer to the pod chamber, and the pod chamber includes at least one drain opening formed therein to allow water to drain from the pod chamber downward into the mug portion of the coffee mug;

the lid of the brewing station including a nozzle positioned such that when the lid is closed, the nozzle engages the inlet opening formed within the the pod retainer and water supplied from the reservoir to the lid flows through the nozzle and inlet opening into the pod chamber;

wherein, the drink cap includes a plurality of drink openings formed therein to allow steam to escape from the mug during brewing and to allow a user to drink from the coffee mug once the brewing is complete, the drink openings being spaced circumferentially apart and being positioned radially outward from the pod chamber.

2. The in-vehicle coffee maker of claim 1 wherein, the pod retainer includes a flow chamber having a plurality of drip holes formed therein such that water flows into the flow chamber through the inlet opening formed within the pod retainer and drips down into the pod chamber through the drip holes.

3. The in-vehicle coffee maker of claim 1 wherein, the brewing station includes a sensor to detect when the coffee mug is present and when the lid is closed.

4. The in-vehicle coffee maker of claim 3, further including a controller adapted to allow water to be supplied to the lid of the brewing station only when the coffee mug is present within the brewing station and the lid is closed.

5. A vehicle console having an in-vehicle coffee maker, comprising:
a console for a motor vehicle;
a coffee mug;
a brewing station formed within the console and adapted to receive the coffee mug, the brewing station having a lid pivotally mounted thereon such that the lid can be pivoted between an open position, wherein the coffee mug can be removably placed within the brewing station, and a closed position, wherein the lid secures the coffee mug within the brewing station;
a water reservoir mounted within the console remote from the brewing station;
a water line extending between the water reservoir and the lid of the brewing station to deliver water from the water reservoir to the brewing station, the water line including a pump assembly for pumping the water from the water reservoir to the lid and a heating element for heating the water to a predetermined temperature;
the coffee mug including a mug portion, a drink cap removably mounted onto the mug portion, and a pod retainer removably mounted onto the drink cap;
the drink cap includes a pod chamber formed therein, the pod chamber is adapted to hold a pod of coffee grounds and the pod retainer is adapted to secure the pod of coffee grounds within the pod chamber, the pod retainer includes an inlet opening formed therein to allow water to be supplied through the pod retainer to the pod chamber, and the pod chamber includes at least one drain opening formed therein to allow water to drain from the pod chamber downward into the mug portion of the coffee mug;
the lid of the brewing station including a nozzle positioned such that when the lid is closed, the nozzle engages the inlet opening formed within the pod retainer and water supplied from the reservoir to the lid flows through the nozzle and inlet opening into the pod chamber.

6. The vehicle console of claim 5 wherein, the pod retainer includes a flow chamber having a plurality of drip holes formed therein such that water flows into the flow chamber through the inlet opening formed within the pod retainer and drips down into the pod chamber through the drip holes.

7. The vehicle console of claim 5 wherein, the drink cap includes a plurality of drink openings formed therein to allow steam to escape from the mug during brewing and to allow a user to drink from the coffee mug once the brewing is complete, the drink openings being spaced circumferentially apart and positioned radially outward from the pod chamber.

8. The vehicle console of claim 5 wherein, the brewing station includes a sensor to detect when the coffee mug is present and when the lid is closed.

9. The vehicle console of claim 8, further including a controller adapted to allow water to be supplied to the lid of the brewing station only when the coffee mug is present within the brewing station and the lid is closed.

10. An in-vehicle coffee maker, comprising:
a coffee mug;
a brewing station adapted to receive the coffee mug, the brewing station having a lid pivotally mounted thereon such that the lid can be pivoted between an open position, wherein the coffee mug can be removably placed within the brewing station, and a closed position, wherein the lid secures the coffee mug within the brewing station;
a water reservoir;
a water line extending between the water reservoir and the lid of the brewing station to deliver water from the water reservoir to the brewing station, the water line including a pump assembly for pumping the water from the water reservoir to the lid and a heating element for heating the water to a predetermined temperature;
the coffee mug including a mug portion, a drink cap removably mounted onto the mug portion, and a pod retainer removably mounted onto the drink cap;
the drink cap includes a pod chamber formed therein, the pod chamber is adapted to hold a pod of coffee grounds and the pod retainer is adapted to secure the pod of coffee grounds within the pod chamber, the pod retainer includes a flow chamber and an opening formed therein to allow water to be supplied to the flow chamber, the flow chamber includes a plurality of drip holes formed therein to allow water to drain from the flow chamber into the pod chamber, and the pod chamber includes at least one opening formed therein to allow water to drain from the pod chamber downward into the mug portion of the coffee mug;
the lid of the brewing station including a nozzle positioned such that when the lid is closed, the nozzle forms a sealed engagement with the opening formed within the pod retainer and water supplied from the reservoir to the lid flows into the pod chamber;
the brewing station including a sensor to detect when the coffee mug is present and when the lid is closed, and a controller adapted to allow water to be supplied to the lid of the brewing station only when the coffee mug is present within the brewing station and the lid is closed;
the drink cap further includes a plurality of drink openings formed therein to allow steam to escape from the mug during brewing and to allow a user to drink from the coffee mug once the brewing is complete, the drink openings being spaced circumferentially apart and positioned radially outward from the pod chamber.

* * * * *